(12) United States Patent
Hecht

(10) Patent No.: US 8,529,162 B2
(45) Date of Patent: Sep. 10, 2013

(54) CUTTING TOOL HAVING AN AMBIDEXTROUS CLAMP AND COOLANT SUPPLY

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 254 days.

(21) Appl. No.: 13/159,181

(22) Filed: Jun. 13, 2011

(65) Prior Publication Data

US 2011/0311323 A1 Dec. 22, 2011

(30) Foreign Application Priority Data

Jun. 22, 2010 (IL) .......................................... 206537

(51) Int. Cl.
*B23B 27/10* (2006.01)
(52) U.S. Cl.
USPC ............................................. 407/11; 407/107
(58) Field of Classification Search
USPC ................. 407/107, 109, 111, 102, 103, 104, 407/11
See application file for complete search history.

(56) References Cited

U.S. PATENT DOCUMENTS

| 4,621,547 | A | * | 11/1986 | Yankoff ........................ 82/1.11 |
| 4,848,198 | A | * | 7/1989 | Royal et al. .................... 82/1.11 |
| 4,955,264 | A | * | 9/1990 | Armbrust ........................ 82/158 |
| 5,100,268 | A | | 3/1992 | Nakayama et al. |
| 5,685,672 | A | | 11/1997 | Tjernström |
| 5,718,156 | A | | 2/1998 | Lagrolet et al. |
| 8,388,268 | B2 | * | 3/2013 | Henry et al. ..................... 407/11 |
| 2002/0114674 | A1 | * | 8/2002 | Hansson ....................... 407/103 |

FOREIGN PATENT DOCUMENTS

| JP | 10 094904 | A | | 4/1998 |
| JP | 10094904 | A | * | 4/1998 |

OTHER PUBLICATIONS

International Search Report dated Oct. 5, 2011 issued in counterpart PCT application (No. PCT/IL2011/000472).

* cited by examiner

*Primary Examiner* — Daniel Howell
*Assistant Examiner* — Nicole N Ramos
(74) *Attorney, Agent, or Firm* — Womble Carlyle

(57) ABSTRACT

A cutting tool includes a tool body and an ambidextrous clamp for removably securing a cutting insert to the tool body. The clamp has at least one internal fluid duct passing through a space between two clamp screw throughbores located mirror symmetrically with respect to a plane of symmetry and extending from a coolant fluid inlet port to at least one discharge orifice. The clamp is secured to the tool body by a single screw located in one of the clamp screw throughbores and threadingly engaged with a single threaded bore of the tool body. The same clamp is used in both left-handed and right-handed tools, and the jet of the coolant fluid is ejected from the discharge orifice of the clamp onto the same region of the cutting insert in both cases.

13 Claims, 5 Drawing Sheets

CUTTING TOOL HAVING AN AMBIDEXTROUS CLAMP AND COOLANT SUPPLY

FIELD OF THE INVENTION

The present invention relates to a cutting tool having a cutting insert retained by a clamp, the clamp having a coolant supply.

BACKGROUND OF THE INVENTION

Within the field of metal cutting operations, there are known many different ways for minimizing the heat accumulated due to the interaction of a cutting insert with a machined workpiece, in order to prevent the cutting insert from damaging the work-piece and to prevent insert wear, by cooling the operative cutting edge. It is advantageous to deliver a coolant directly to the cutting area, using a cutting tool having a coolant supply, directing a coolant fluid to a cutting edge of the cutting insert.

In addition, it is also necessary to secure the cutting insert to an insert pocket of the cutting tool. U.S. Pat. No. 5,685,672 discloses a cutting tool having a clamp for clamping a cutting insert in an insert pocket. The forward end of the clamp has a first (front) protrusion which engages the wall of a through hole of the insert. The rear end of the clamp has a second (rear) protrusion which engages a sloping surface of the toolholder. A clamp screw extends through the clamp and threadingly engages a bore in the toolholder. When the clamp screw is tightened, the clamp is urged both downwardly and rearwardly and consequently the cutting insert is pushed both downwardly and rearwardly until the cutting insert is firmly secured in the insert pocket. As can be seen in FIG. 2 of U.S. Pat. No. 5,685,672, in a top view of the toolholder, the clamp is not positioned symmetrically with respect to the cutting insert. A line passing through the center of the clamp screw and through the center of the first protrusion, in a top view as seen in FIG. 2 of U.S. Pat. No. 5,685,672, does not pass through the rear corner and operative front corner of the insert. This non-symmetrical positioning stems from the well known three-point support of the cutting insert by the support surfaces (16, 17) of the insert pocket, with one support point on one of the support surfaces (16) and two support points on the other support surface (17). A similar clamping mechanism is disclosed in U.S. Pat. No. 5,100,268 where the non-symmetrical positioning of the clamp relative to the cutting insert can be seen in FIG. 2.

Clamping mechanisms of the type having a front protrusion which engages the wall of a through hole of the insert and a rear protrusion which engages the toolholder are advantageous in that they firmly secure the cutting insert in the insert pocket of the toolholder.

Clamps are ideal for delivering a coolant directly to the cutting area since they are located above the cutting insert close to the cutting area. U.S. Pat. No. 4,848,198 discloses a cutting tool having a bridge-type clamping block which functions both to clamp an insert within a seat and to direct fluid at a produced chip for breaking the chip into segments. The clamping block is not of the type mentioned above. It does not have a front protrusion which engages the wall of a through hole of the insert. Also, the fluid is led through passageways passing through the support bar and requires connecting passageways and a deformable seal to lead the fluid to the discharge orifice.

U.S. Pat. No. 4,621,547 discloses a cutting tool having a clamp which functions both to clamp an insert within a seat and to direct coolant onto the top surface of the insert toward the cutting edge. The clamp has a port which is connected to a coolant delivery line for delivering coolant directly to the clamp. The clamp is not of the type mentioned above. It does not have a front protrusion which engages the wall of a through hole of the insert and it does not have a rear protrusion for engaging the toolholder.

SUMMARY OF THE INVENTION

In accordance with the present invention there is provided a cutting tool comprising a tool body, an ambidextrous clamp and a cutting insert;

the tool body comprising a shank portion and a head portion, the head portion comprising an insert pocket with the cutting insert removably secured therein by the ambidextrous clamp, and in a region removed from the insert pocket a single tool body threaded bore;

the ambidextrous clamp exhibiting mirror symmetry about a first plane and comprising:

two clamp screw throughbores located mirror symmetrically with respect to the first plane;

at least one internal fluid duct passing through a space between the two clamp screw throughbores and extending from a coolant fluid inlet port to at least one discharge orifice, the at least one discharge orifice being positioned symmetrically with respect to the first plane, the at least one internal fluid duct for conveying coolant fluid to the at least one discharge orifice for ejection towards an operative cutting corner of the cutting insert; wherein:

the ambidextrous clamp is secured to the tool body by a single clamp screw located in one of the clamp screw throughbores and threadingly engaged with the single tool body threaded bore;

for a left-handed cutting tool, the single clamp screw is located in one of the clamp screw throughbores; and for a right-handed cutting tool, the single clamp screw is located in the other clamp screw throughbore.

In accordance with the present invention, there is also provided a toolholder comprising a cutting tool body and an ambidextrous clamp wherein:

the cutting tool body comprises:

a shank portion; and a head portion connected to the shank portion, the head portion comprising an insert pocket and a single tool body threaded bore formed in a region removed from the insert pocket;

the ambidextrous clamp exhibits mirror symmetry about a first plane and comprises:

two clamp screw throughbores located mirror symmetrically with respect to the first plane; and at least one internal fluid duct passing through a space between the two clamp screw throughbores and extending from a coolant fluid inlet port to at least one discharge orifice, the at least one discharge orifice being positioned symmetrically with respect to the first plane, the at least one internal fluid duct for conveying coolant fluid to the at least one discharge orifice for ejection during cutting operations; and the ambidextrous clamp is securable to the cutting tool body by a single clamp screw located in one of the clamp screw throughbores and threadingly engaged with the single tool body threaded bore.

BRIEF DESCRIPTION OF THE FIGURES

For a better understanding of the present invention and to show how the same may be carried out in practice, reference will now be made to the accompanying drawings, in which.

DETAILED DESCRIPTION OF THE PRESENT INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 10:
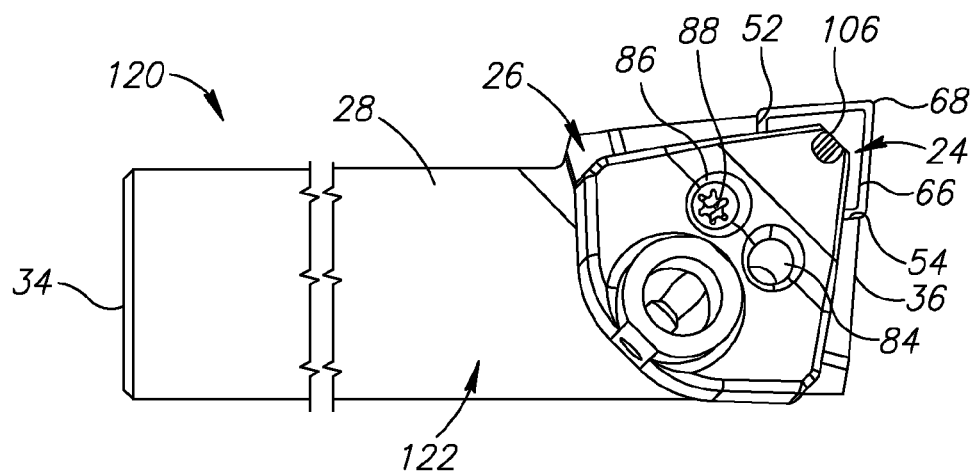
FIG. 10 is a top view of a right-handed cutting tool in accordance with the present invention.
Figure 11:
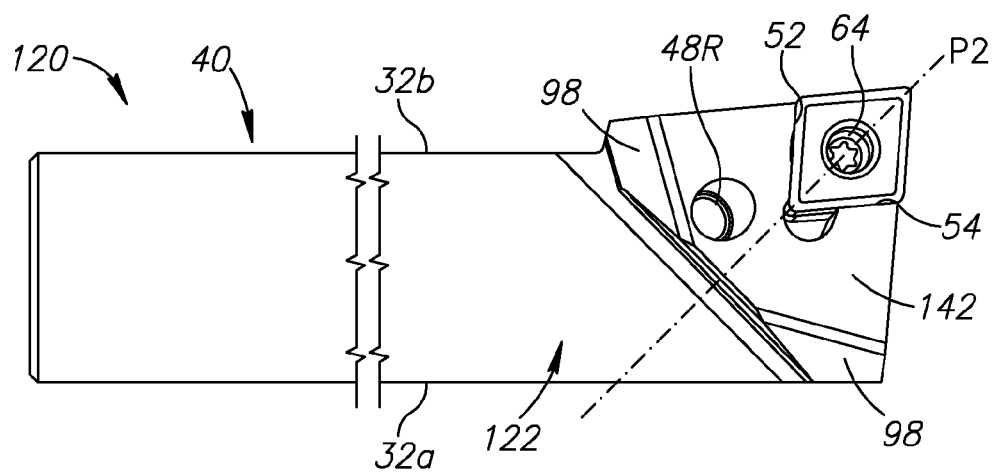
FIG. 11 is a top view of the cutting tool shown in FIG. 10 with the clamp removed.

Reference is made to FIGS. 1 to 5, showing a left-handed cutting tool 20 in accordance with the present invention, and also to FIGS. 10 and 11, showing a right-handed cutting tool 120, in accordance with the present invention. The cutting tool 20, 120 may be used for metal cutting operations, such as, for example, turning operations. The cutting tool 20, 120 includes a tool body 22, 122, a cutting insert 24 and an ambidextrous clamp 26. The clamp 26 is ambidextrous in the sense that it can be used to form either a left-handed cutting tool or a right-handed cutting tool, as described below. The clamp 26 and tool body 22, 122 together form a toolholder which, together with the cutting insert 24, forms the cutting tool 20, 120.

The tool body 22, 122 may have, as shown, a substantially quadrangular column shape with opposing, generally parallel, tool body top and bottom surfaces 28, 30 and tool body left and right side surfaces 32a, 32b extending therebetween. Opposing tool body rear and front surfaces 34, 36 extend between the tool body left and right side surfaces 32a, 32b. The tool body 22, 122 includes a head portion 38 adjacent the tool body front surface 36 and a shank portion 40 extending from the head portion 38 rearwardly to the rear surface 34. The head portion 38 has an upper surface 42, 142 and a lower surface 44 and contains an insert pocket 46 recessed in the upper surface 42, 142, with the cutting insert 24 removably secured therein by the clamp 26. A single tool body threaded bore 48L, 48R is formed in the upper surface 42, 142 in a region removed from the insert pocket 46. The insert pocket 46 contains a base 50 and support walls 52, 54 to retain the cutting insert 24 and to define the location and orientation of the cutting insert 24.

The base 50 may include an insert pocket threaded bore 56 extending in an upward to downward direction.

The cutting insert 24 has opposing cutting insert top and bottom surfaces 58, 60, and a peripheral surface 62 extending therebetween. The cutting insert top surface 58 includes a rake surface 66, and a cutting corner 68 is located at the intersection of the rake surface 66 with the peripheral surface 62.

A through hole 64 may extend between and open out at the cutting insert top and bottom surfaces 58, 60. The cutting insert 24 may be mounted on an insert shim 70, as shown in the figures. The insert shim 70 may be retained in the insert pocket 46 by a shim screw 72 threadingly received in the insert pocket threaded bore 56.

Figure 8:
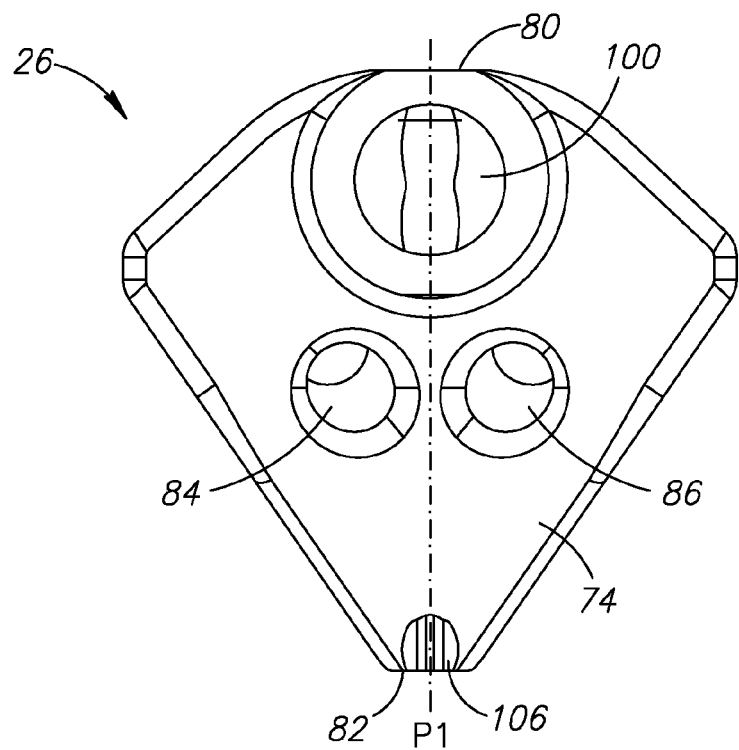
FIG. 8 is a top view of the clamp shown in FIG. 1.
Figure 9:
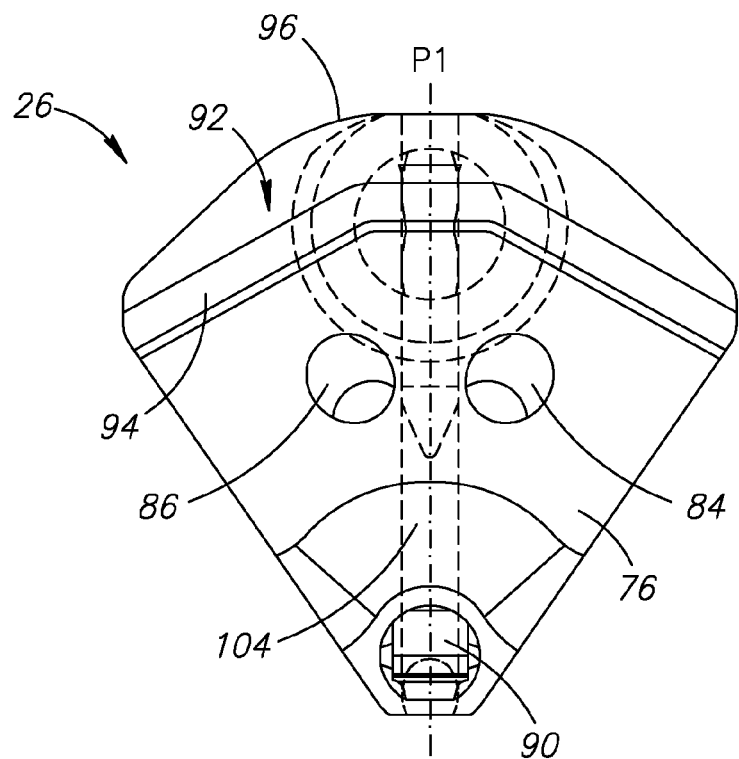
FIG. 9 is a bottom view of the clamp shown in FIG. 1.

As can be seen, for example, in FIGS. 6 to 9, the clamp 26 exhibits mirror symmetry about a first plane P1 and includes clamp top and bottom surfaces 74, 76, and clamp side surfaces 78 extending therebetween. Opposing clamp rear and front surfaces 80, 82 extend between the clamp side surfaces 78. Two clamp screw throughbores 84, 86 extend between the clamp top and bottom surfaces 74, 76, in order to accommodate a clamp screw 88. The two clamp screw throughbores 84, 86 are located mirror symmetrically with respect to the first plane P1. In a top view of the clamp 26, as shown in FIG. 8, the clamp screw throughbore 86 located on the right side of the first plane P1 will be referred to as a right clamp screw throughbore 86, and the clamp screw throughbore 84 located on the left side of the first plane P1 will be referred to as a left clamp screw throughbore 84.

The clamp 26 may include a forward protrusion 90 protruding from the clamp bottom surface 76 adjacent the clamp front surface 82 for engaging a portion of the through hole 64 of the cutting insert 24, when the cutting insert 24 is secured to the insert pocket 46.

The clamp 26 may also include a rear protrusion 92 protruding from the clamp bottom surface 76 having opposing first and second protrusion surfaces 94, 96. The first protrusion surface 94 may be inclined with respect to the clamp bottom surface 76 and the second protrusion surface 96 may extend from the clamp rear surface 80.

Figure 3:
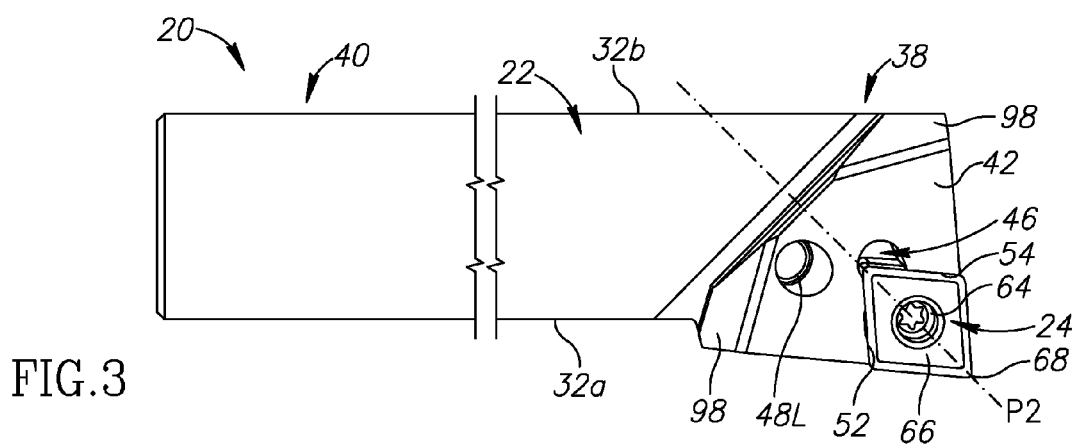
FIG. 3 is a top view of the cutting tool shown in FIG. 1 with the clamp removed.

In some embodiments, as shown in FIGS. 3 and 11, a second plane P2 may bisect both the upper surface 42, 142 and the insert pocket 46, and the tool body 22, 122 may include two inclined contact surfaces 98, one inclined contact surface 98 located on each side of the second plane P2. The inclined contact surfaces 98 may each extend from the tool body top surface 28 to the upper surface 42, 142 of the head portion 38 and simultaneously abut two abutment portions on the first protrusion surface 94 of the clamp 26 when the cutting insert 24 is secured to the insert pocket 46.

It should be appreciated that in other embodiments (not shown), the tool body 22, 122 may equally include a single inclined contact surface having two contact zones, one contact zone located on each side of the second plane P2 simultaneously abutting the two abutment portions on the first protrusion surface 94 of the clamp 26.

The clamp 26 is secured to the upper surface 42, 142 by a single clamp screw 88 located in one of the clamp screw throughbores 84, 86 and threadingly engaged with the tool body threaded bore 48L, 48R.

Figure 4:
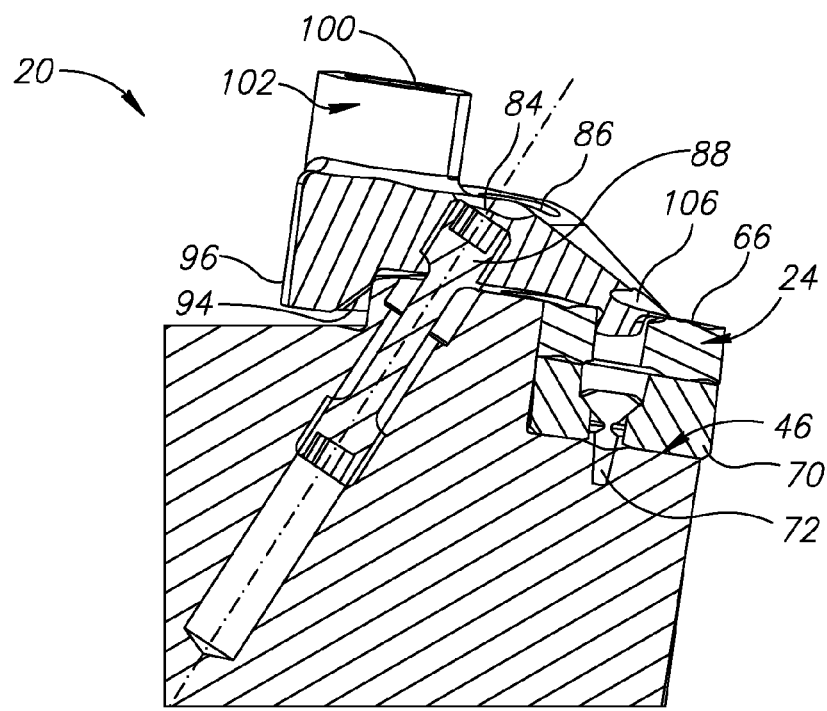
FIG. 4 is a cross sectional view taken along the line IV-IV in FIG. 2.
Figure 5:
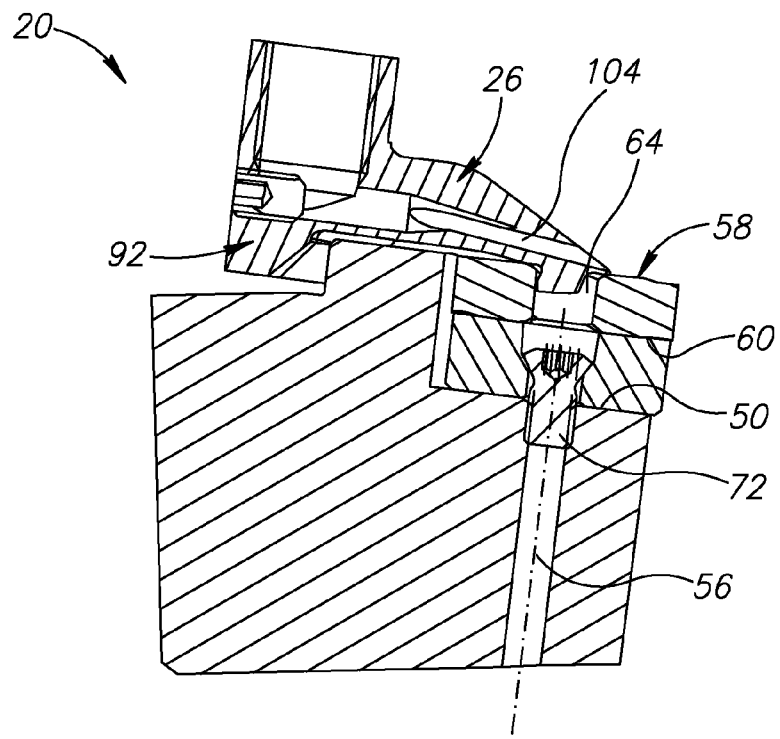
FIG. 5 is a cross sectional view taken along the line V-V in FIG. 2.
Figure 6:
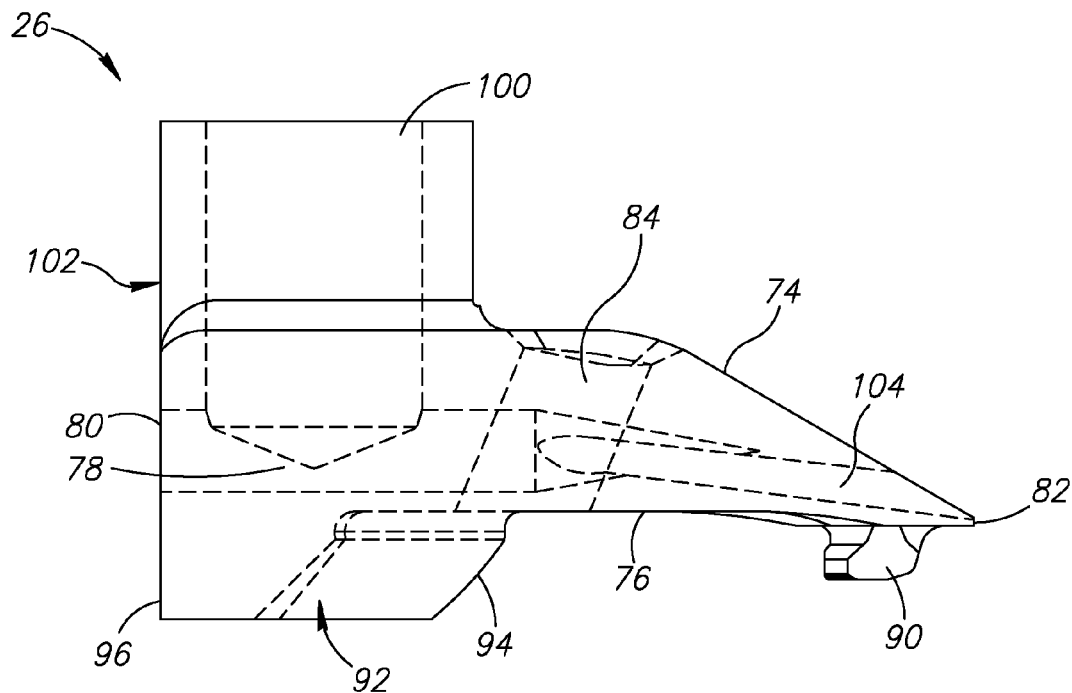
FIG. 6 is a side view of the clamp shown in FIG. 1.
Figure 7:
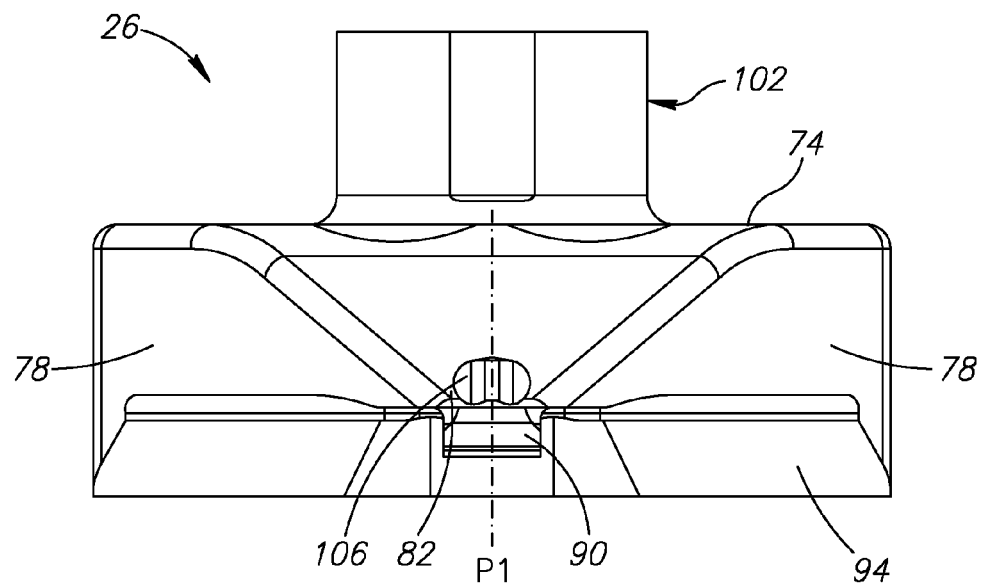
FIG. 7 is a front view of the clamp shown in FIG. 1.

In some embodiments, as shown in FIG. 4, the clamp screw throughbores 84, 86 may be threaded and the single clamp screw 88 may have threads of opposite hand, i.e. left-handed and right-handed male threaded portions.

The clamp 26 has a connector 102 protruding from the clamp top surface 74 and a fluid inlet port 100 extending therethrough. In order to supply coolant fluid to the clamp 26, a pipe connected to an external coolant fluid supply (not shown) is connected to the connector 102.

The clamp 26 has an internal fluid duct 104 for directing a jet of coolant fluid onto the cutting insert 24. The jet of the coolant fluid is ejected from a discharge orifice 106 of the internal fluid duct 104 located in the clamp front surface 82.

The internal fluid duct 104 extends from the coolant fluid inlet port 100 to the discharge orifice 106, passing through a space between the two clamp screw throughbores 84, 86.

In some embodiments, the clamp may include several internal fluid ducts 104 and an equal number of discharge orifices 106 positioned symmetrically with respect to the first plane P1.

Figure 1:
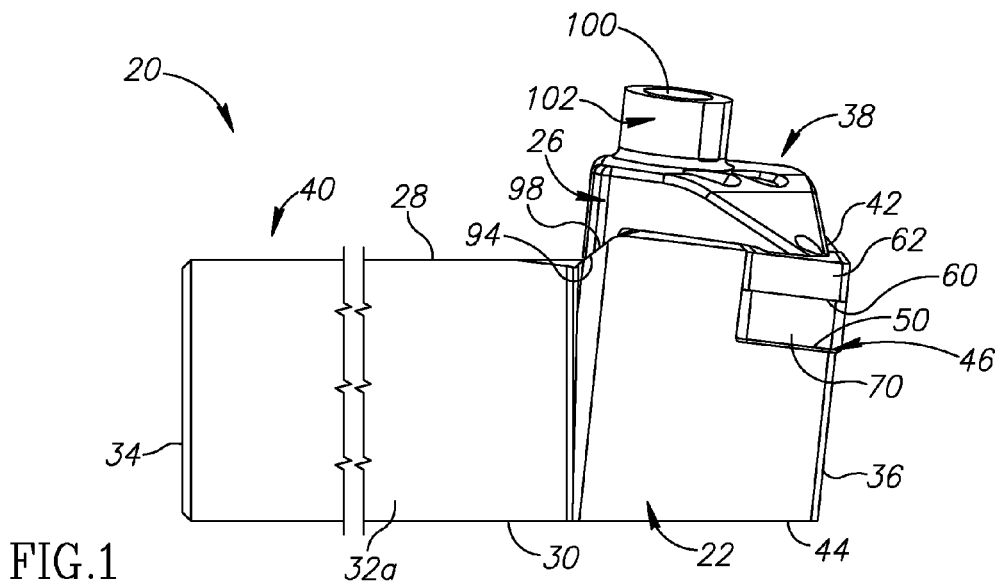
FIG. 1 is a side view of a left-handed cutting tool in accordance with the present invention.
Figure 2:
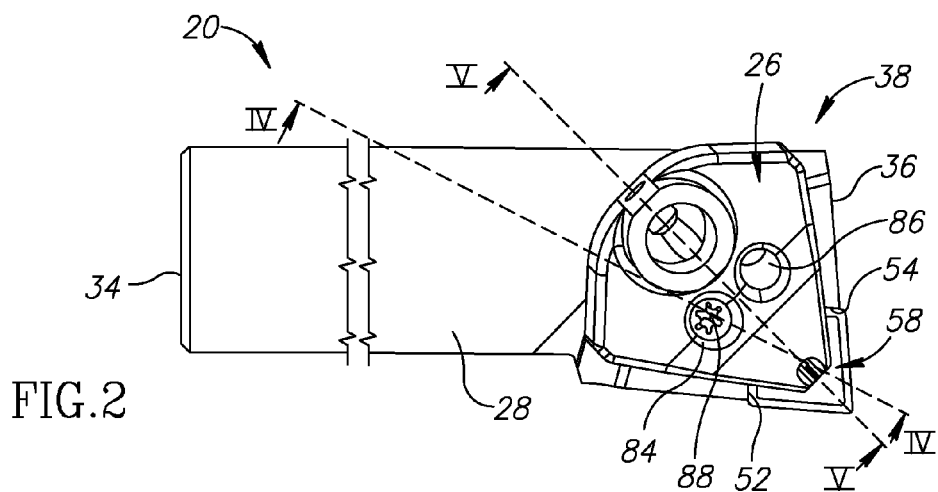
FIG. 2 is a top view of the cutting tool shown in FIG. 1.

Attention is drawn to a top view of the cutting tool 20, in FIGS. 2 and 3, showing a left-handed cutting tool 20 having a left-handed tool body 22. For the left-handed cutting tool 20, the tool body threaded bore 48L is located on one side of the second plane P2 adjacent the tool body left side surface 32a. Therefore, for the left-handed cutting tool 20 the tool body threaded bore 48L will be referred to as a left threaded bore 48L. The single clamp screw 88 is threadingly engaged with both the left clamp screw throughbore 84 and the left threaded bore 48L. The clamping forces are directed downward and towards the support wall 52 of the insert pocket 46 located between the left threaded bore 48L and the operative cutting corner 68.

Attention is drawn now to a top view of the cutting tool 120, in FIGS. 10 and 11, showing a right-handed cutting tool 120 having a right-handed tool body 122 and the same clamp 26. For the right-handed cutting tool 120, the tool body threaded bore 48R is located on one side of the second plane P2 adjacent the tool body right side surface 32b. Therefore, for a right-handed cutting tool 120 the tool body threaded bore 48R will be referred to as a right threaded bore 48R. The single clamp screw 88 is threadingly engaged in both the right clamp screw throughbore 86 and the right threaded bore 48R. The clamping forces are directed downward and towards the support wall 52 of the insert pocket 46 located between the right threaded bore 48R and the operative cutting corner 68.

Although the clamping of the cutting insert 24 in the left-handed and right-handed tools 20, 120 takes place with the single clamp screw 88 located on different sides of the first plane P1, the same clamp 26 is used in both cases and the clamp 26 is symmetric in structure (with reference to the first plane P1). In a similar vein, for both the left-handed and right-handed tools 20, 120, the same two abutment portions on the first protrusion surface 94 of the clamp 26 simultaneously abut the two inclined contact surfaces 98 of the left-handed tool body 22 and the right-handed tool body 122. In both left-handed and right-handed tools 20, 120, the jet of the coolant fluid is ejected from the discharge orifice 106 of the clamp 26 onto the same region of the cutting insert 24, for example, onto the rake surface 66 and the operative cutting corner 68, directly to the interaction area of the cutting tool 20, 120 with the workpiece.

Although the present invention has been described to a certain degree of particularity, it should be understood that various alterations and modifications could be made without departing from the scope of the invention as hereinafter claimed.

What is claimed is:

1. A cutting tool (20, 120) comprising a tool body (22, 122), an ambidextrous clamp (26) and a cutting insert (24);

the tool body (22, 122) comprising a shank portion (40) and a head portion (38), the head portion (38) comprising an insert pocket (46) with the cutting insert (24) removably secured therein by the ambidextrous clamp (26), and in a region removed from the insert pocket (46) a single tool body threaded bore (48L, 48R);

the cutting insert (24) comprising opposing cutting insert top and bottom surfaces (58, 60) and a through hole (64) extending between and opening at the cutting insert top and bottom surfaces (58, 60);

the ambidextrous clamp (26) exhibiting mirror symmetry about a first plane (P1) and comprising:

two clamp screw throughbores (84, 86) located mirror symmetrically with respect to the first plane (P1);

a forward protrusion (90) for engaging a portion of the through hole (64), when the cutting insert (24) is secured to the insert pocket (46);

at least one internal fluid duct (104) passing through a space between the two clamp screw throughbores (84, 86) and extending from a coolant fluid inlet port (100) to at least one discharge orifice (106), the at least one discharge orifice (106) being positioned symmetrically with respect to the first plane (P1), the at least one internal fluid duct (104) for conveying coolant fluid to the at least one discharge orifice (106) for ejection towards an operative cutting corner (68) of the cutting insert (24); wherein:

the ambidextrous clamp (26) is secured to the tool body (22, 122) by a single clamp screw (88) located in one of the clamp screw throughbores (84, 86) and threadingly engaged with the single tool body threaded bore (48L, 48R);

for a left-handed cutting tool (20), the single clamp screw (88) is located in one of the clamp screw throughbores (84); and for a right-handed cutting tool (120), the single clamp screw (88) is located in the other clamp screw throughbore (86).

2. The cutting tool (20, 120) according to claim 1, wherein the ambidextrous clamp (26) further comprises a rear protrusion (92) having two abutment portions, and for the left-handed cutting tool (20), the two abutment portions simultaneously abut two inclined contact surfaces (98) of the left-handed tool body (22), and for the right-handed cutting tool (120), the same two abutment portions simultaneously abut two inclined contact surfaces (98) of the right-handed tool body (122).

3. The cutting tool (20, 120) according to claim 1, wherein the head portion (38) includes an upper surface (42, 142) and a second plane (P2) bisects both the upper surface (42, 142) and the insert pocket (46), and wherein the single tool body threaded bore (48L, 48R) is located on one side of the second plane (P2).

4. The cutting tool (20, 120) according to claim 1, wherein the clamp screw throughbores (84, 86) are threaded and the single clamp screw (88) has threads of opposite hand, and for the left-handed cutting tool (20), the single clamp screw (88) is threadingly engaged with a left clamp screw throughbore (84) and a left threaded bore (48L), and for the right-handed cutting tool (120), the single clamp screw (88) is threadingly engaged with a right clamp screw throughbore (86) and a right threaded bore (48R).

5. A toolholder comprising a cutting tool body (22, 122) and an ambidextrous clamp (26) wherein:

the cutting tool body (22, 122) comprises:

a shank portion (40); and a head portion (38) connected to the shank portion (40), the head portion (38) comprising an insert pocket (46) and a single tool body threaded bore (48L, 48R) formed in a region removed from the insert pocket (46);

the ambidextrous clamp (26) exhibits mirror symmetry about a first plane (P1) and comprises:

two clamp screw throughbores (84, 86) located mirror symmetrically with respect to the first plane (P1);

a forward protrusion (90) configured to engage a cutting insert (24) retained in the insert pocket (46), when the ambidextrous clamp (26) is secured to the cutting tool body (22, 122);

a rear protrusion (92) having two abutment portions configured to simultaneously abut two inclined contact surfaces (98) of the cutting tool body (22, 122); and at least one internal fluid duct (104) passing through a space between the two clamp screw throughbores (84, 86) and extending from a coolant fluid inlet port (100) to at least one discharge orifice (106), the at least one discharge orifice (106) being positioned symmetrically with respect to the first plane (P1), the at least one internal fluid duct (104) for conveying coolant fluid to the at least one discharge orifice (106) for ejection during cutting operations; and the ambidextrous clamp (26) is securable to the cutting tool body (22, 122) by a single clamp screw (88) located in one of the clamp screw throughbores (84, 86) and threadingly engaged with the single tool body threaded bore (48L, 48R).

6. The toolholder according to claim 5, wherein:
the ambidextrous clamp (26) is secured to the cutting tool body (22, 122);
a clamp screw (88) is located in one of the clamp screw throughbores (84, 86) to secure the ambidextrous clamp (26) to the cutting tool body (22, 122); and
no clamp screw is located in the other of the clamp screw throughbores (84, 86).

7. The toolholder according to claim 5, wherein:
the head portion (38) includes an upper surface (42, 142);
a second plane (P2) bisects both the upper surface (42, 142) and the insert pocket (46); and
the single tool body threaded bore (48L, 48R) is located on one side of the second plane (P2).

8. The toolholder according to claim 5, wherein the cutting tool body is a left-handed cutting tool body (22).

9. The toolholder according to claim 8, wherein:
the clamp screw throughbores (84, 86) are threaded;
the single clamp screw (88) has threads of opposite hand; and
the single clamp screw (88) is threadingly engaged with a left clamp screw throughbore (84) and a left threaded bore (48L).

10. The toolholder according to claim 5, wherein the cutting tool body is a right-handed cutting tool body (122).

11. The toolholder according to claim 10, wherein:
the clamp screw throughbores (84, 86) are threaded;
the single clamp screw (88) has threads of opposite hand; and
the single clamp screw (88) is threadingly engaged with a right clamp screw throughbore (86) and a right threaded bore (48R).

12. A toolholder comprising a cutting tool body (22, 122) and an ambidextrous clamp (26) wherein:
the cutting tool body (22, 122) comprises:
a shank portion (40); and
a head portion (38) connected to the shank portion (40), the head portion (38) comprising an insert pocket (46) and a single tool body threaded bore (48L, 48R) formed in a region removed from the insert pocket (46);
the ambidextrous clamp (26) exhibits mirror symmetry about a first plane (P1) and comprises:
two clamp screw throughbores (84, 86) located mirror symmetrically with respect to the first plane (P1); and
at least one internal fluid duct (104) passing through a space between the two clamp screw throughbores (84, 86) and extending from a coolant fluid inlet port (100) to at least one discharge orifice (106), the at least one discharge orifice (106) being positioned symmetrically with respect to the first plane (P1), the at least one internal fluid duct (104) for conveying coolant fluid to the at least one discharge orifice (106) for ejection during cutting operations; and the ambidextrous clamp (26) is securable to the cutting tool body (22, 122) by a single clamp screw (88) located in one of the clamp screw throughbores (84, 86) and threadingly engaged with the single tool body threaded bore (48L, 48R);

wherein the cutting tool body is a left-handed cutting tool body (22);

the clamp screw throughbores (84, 86) are threaded;

the single clamp screw (88) has threads of opposite hand; and the single clamp screw (88) is threadingly engaged with a left clamp screw throughbore (84) and a left threaded bore (48L).

13. A toolholder comprising a cutting tool body (22, 122) and an ambidextrous clamp (26) wherein:
the cutting tool body (22, 122) comprises:
a shank portion (40); and
a head portion (38) connected to the shank portion (40), the head portion (38) comprising an insert pocket (46) and a single tool body threaded bore (48L, 48R) formed in a region removed from the insert pocket (46);
the ambidextrous clamp (26) exhibits mirror symmetry about a first plane (P1) and comprises:
two clamp screw throughbores (84, 86) located mirror symmetrically with respect to the first plane (P1); and
at least one internal fluid duct (104) passing through a space between the two clamp screw throughbores (84, 86) and extending from a coolant fluid inlet port (100) to at least one discharge orifice (106), the at least one discharge orifice (106) being positioned symmetrically with respect to the first plane (P1), the at least one internal fluid duct (104) for conveying coolant fluid to the at least one discharge orifice (106) for ejection during cutting operations; and the ambidextrous clamp (26) is securable to the cutting tool body (22, 122) by a single clamp screw (88) located in one of the clamp screw throughbores (84, 86) and threadingly engaged with the single tool body threaded bore (48L, 48R);

wherein the cutting tool body is a right-handed cutting tool body (122);

the clamp screw throughbores (84, 86) are threaded;

the single clamp screw (88) has threads of opposite hand; and the single clamp screw (88) is threadingly engaged with a right clamp screw throughbore (86) and a right threaded bore (48R).

* * * * *